US010754311B2

(12) United States Patent
Matsuda et al.

(10) Patent No.: US 10,754,311 B2
(45) Date of Patent: Aug. 25, 2020

(54) FORMING CONTROL APPARATUS, AND METHOD AND STORAGE MEDIUM THEREFOR

(71) Applicant: CANON KABUSHIKI KAISHA, Tokyo (JP)

(72) Inventors: Kotaro Matsuda, Kawasaki (JP); Takeshi Ishikura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 224 days.

(21) Appl. No.: 15/462,235

(22) Filed: Mar. 17, 2017

(65) Prior Publication Data

US 2017/0282458 A1   Oct. 5, 2017

(30) Foreign Application Priority Data

Mar. 30, 2016   (JP) ................. 2016-069176

(51) Int. Cl.
| | |
|---|---|
| *G05B 15/02* | (2006.01) |
| *B33Y 30/00* | (2015.01) |
| *B33Y 50/02* | (2015.01) |
| *G05B 19/4099* | (2006.01) |
| *B29C 64/393* | (2017.01) |

(52) U.S. Cl.
CPC ............ *G05B 15/02* (2013.01); *B29C 64/393* (2017.08); *B33Y 30/00* (2014.12); *B33Y 50/02* (2014.12); *G05B 19/4099* (2013.01); *G05B 2219/49023* (2013.01)

(58) Field of Classification Search
CPC ................ G05B 15/02; G05B 19/4099; G05B 2219/49023; B33Y 30/00; B33Y 50/02; B29C 64/393

USPC ............................................ 700/118
See application file for complete search history.

(56) References Cited

U.S. PATENT DOCUMENTS

| | | | |
|---|---|---|---|
| 7,290,221 B2 | 10/2007 | Anderson | |
| 2004/0207662 A1 | 10/2004 | Anderson | |
| 2005/0234577 A1* | 10/2005 | Loughran | G06Q 10/06 700/100 |
| 2012/0267827 A1* | 10/2012 | Kritchman | G05B 19/4099 264/308 |
| 2015/0217519 A1 | 8/2015 | Otten | |
| 2016/0016362 A1* | 1/2016 | Kim | B23Q 15/00 700/98 |
| 2016/0046074 A1* | 2/2016 | Jang | B33Y 50/02 700/119 |
| 2016/0274572 A1* | 9/2016 | Littrell | G06F 17/50 |
| 2017/0173888 A1* | 6/2017 | Thomas-Lepore | G06F 21/31 |

FOREIGN PATENT DOCUMENTS

| | | |
|---|---|---|
| EP | 1031392 A2 | 8/2000 |
| EP | 2902175 A1 | 8/2015 |
| JP | H09-216291 A | 8/1997 |

(Continued)

*Primary Examiner* — James J Lee
*Assistant Examiner* — Michael W Choi
(74) *Attorney, Agent, or Firm* — Canon U.S.A., Inc. IP Division

(57) ABSTRACT

Exemplary embodiments of the present invention control a forming unit of a 3D printer so as to additionally form a second object in a free space in the forming unit when receiving an instruction to form the second object and forming data in the middle of a forming process for a first object by the forming unit.

18 Claims, 9 Drawing Sheets

STEREOLITHOGRAPHY METHOD

(56) References Cited

FOREIGN PATENT DOCUMENTS

| JP | 2002-500966 | A | 1/2002 | |
|----|----|----|----|----|
| JP | 2012-96426 | A | 5/2012 | |
| JP | 2015-085663 | A | 5/2015 | |
| KR | 10-2016-0020730 | A | 2/2016 | |
| WO | WO 2015/022572 | A2 * | 2/2015 | ............. G06T 19/00 |
| WO | 2016/024667 | A1 | 2/2016 | |
| WO | 2016/032544 | A1 | 3/2016 | |

* cited by examiner

MATERIAL SHEET
LAMINATION METHOD

MATERIAL SHEET

STEREOLITHOGRAPHY
METHOD

PATTERN 1 FOR DELAYED JOIN PROCESS

PATTERN 2 FOR DELAYED JOIN PROCESS

FIG.8

SELECT 3D PRINTER

[DEVICE 1 ▼] ~802

FORMING SETTINGS

QUALITY  [LOW ▲▼]

. . .

[ADVANCED SETTINGS]

803
SETTINGS REGARDING DELAYED JOIN PROCESS

DELAYED JOIN PROCESS  [OK ▲▼] ~804

805 ~ ☑ TIME PERIOD UNTIL COMPLETION OF FORMATION  [2 HOURS ▲▼] ~806

[ENTER]  [CANCEL]

FORMING PROCESS

FORMING CONTROL APPARATUS, AND METHOD AND STORAGE MEDIUM THEREFOR

BACKGROUND OF THE INVENTION

Field of the Invention

The present invention relates to a technique for forming a three-dimensional object with use of a material.

Description of the Related Art

In recent years, forming apparatuses for forming three-dimensional objects, so-called three-dimensional (3D) printers have been becoming widely prevalent.

Japanese Patent Application Laid-Open No. 2012-96426 discusses a technique for reducing a forming time period and the like by causing a computer (a personal computer (PC)) that issues a forming instruction to a forming apparatus to issue a single forming instruction for forming a plurality of target objects while placing the objects close to each other or one another. More specifically, based on a plurality of pieces of model data and parameters set for forming them, a layout when the objects are collectively formed is determined before the forming instruction thereof.

The PC is able to issue such a single forming instruction as the one for putting the plurality of pieces of model data together in advance and forming objects as discussed in Japanese Patent Application Laid-Open No. 2012-96426, if the forming instruction has not yet issued.

However, if, after a user issues the forming instruction based on some model data, the user gets the urge to further form, for example, another object relating to the object being formed by the forming apparatus, the user has had to reissue the forming instruction after completion of the forming process of the object that is being formed.

SUMMARY OF THE INVENTION

According to an aspect of the present invention, a forming control apparatus for controlling a forming process performed by a forming unit configured to form a three-dimensional object includes a memory storing codes, and a processor which is capable of executing the codes causing the forming control apparatus to: receive, during the forming process for a first object performed by the forming unit, an instruction to form a second object, which is different from the first object, and forming data corresponding to the second object; specify a third three-dimensional space where an object can be additionally formed by the forming unit, based on a first three-dimensional space of the forming unit where an object can be formed and a second three-dimensional space required to form the first object in the first three-dimensional space; determine whether the second object can be formed in the third three-dimensional space; issue, to the forming unit, a forming control command based on the forming data for forming the second object in the third three-dimensional space, in addition to a forming control command for forming the first object, in a case where it is determined that the second object can be formed in the third three-dimensional space; and issue a completion notification in a case where the forming process for the first object and the second object by the forming unit is completed.

Further features of the present invention will become apparent from the following description of exemplary embodiments with reference to the attached drawings.

BRIEF DESCRIPTION OF THE DRAWINGS

FIGS. 3A-1, 3A-2, and 3B illustrate examples of forming methods to which the present exemplary embodiment is applicable.

FIG. 8 illustrates an example of a setting screen for making forming settings for the delayed join process.

DESCRIPTION OF THE EMBODIMENTS

Exemplary embodiments of the present invention will be described below with reference to the drawings.

The exemplary embodiments of the present invention will use a term "delayed join process" to refer to a method for, in the middle of one forming process for some object at a forming apparatus, instructing the forming apparatus to additionally form another object and forming the plurality of objects collectively in the single forming process, and will propose methods for realizing the delayed join process.

For the "delayed join process" according to the present exemplary embodiments, there are a method that is forming the plurality of objects in parallel from halfway through the single forming process, and a method that is forming the plurality of objects sequentially during the single forming process.

Figure 1:
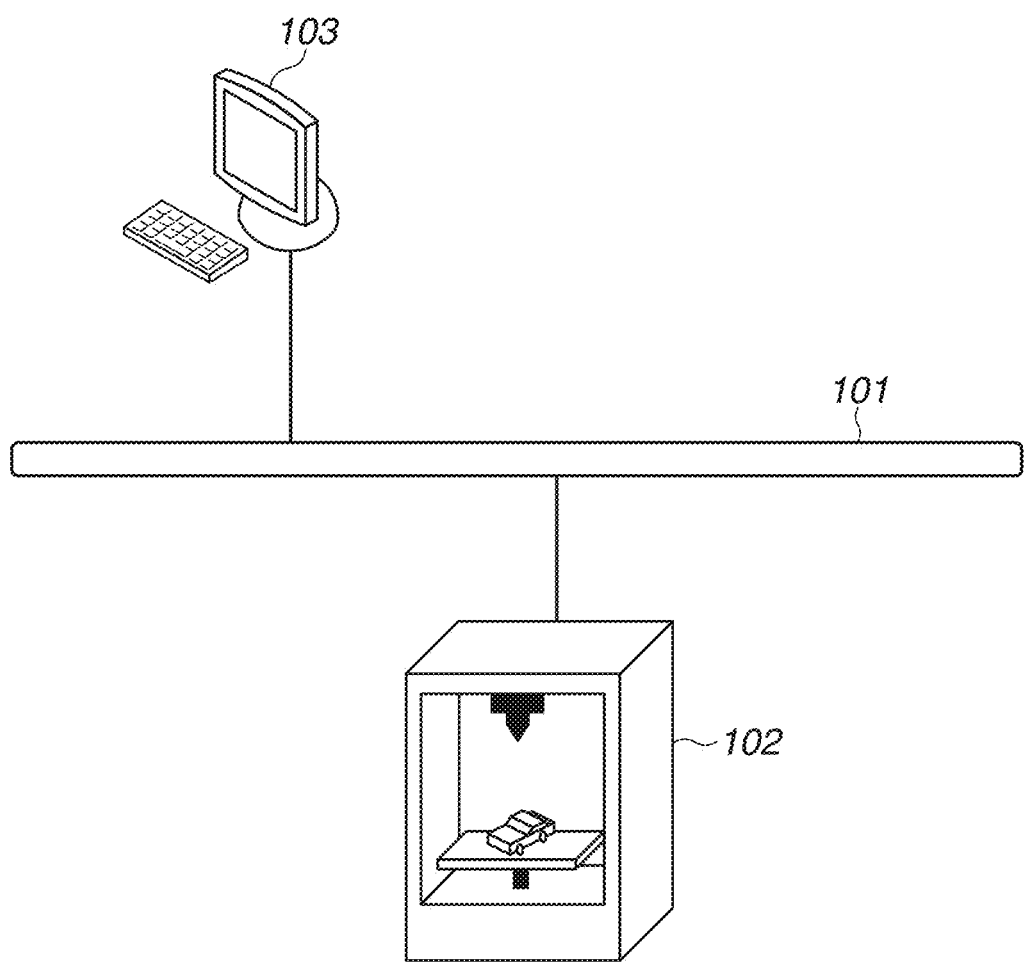
FIG. 1 illustrates an example of a configuration of a system according to an exemplary embodiment of the present invention.

FIG. 1 illustrates an example of a configuration of a system according to a first exemplary embodiment of the present invention.

A personal computer (PC) 103 and a forming apparatus 102 are connected to each other via a network 101, such as a local area network (LAN).

The PC 103 transmits forming data for forming a target object to the forming apparatus 102. The forming apparatus 102 receives the forming data and performs a forming process for forming a three-dimensional object. There may be a plurality of forming apparatuses in the system, and a user who uses a forming apparatus can arbitrarily select an apparatus with which the user wants to perform the forming process from the plurality of forming apparatuses.

Figure 2A:
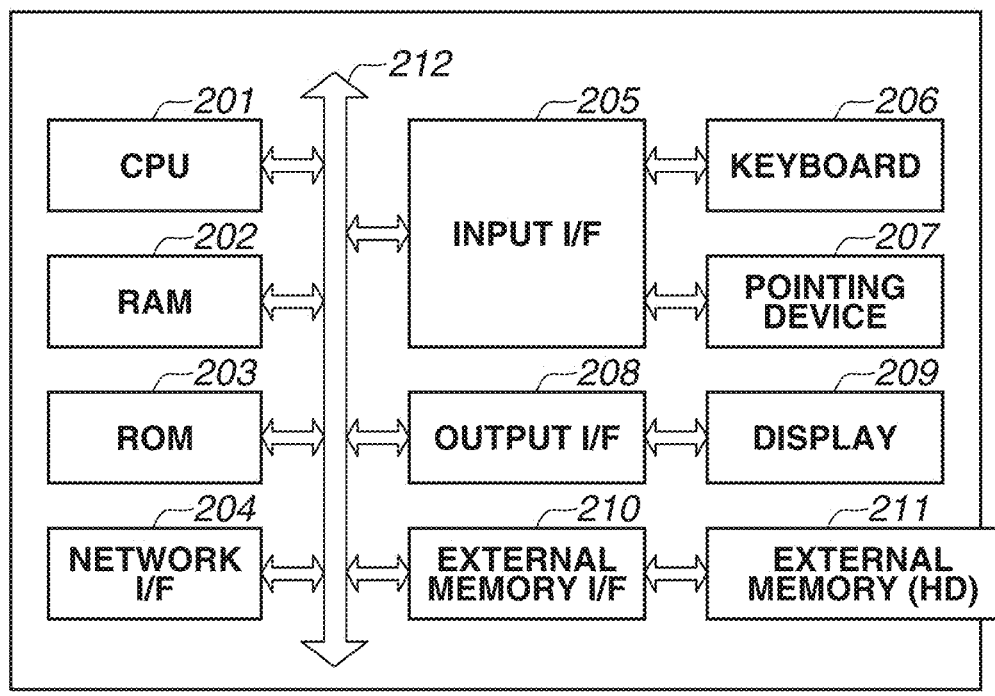
FIGS. 2A and 2B illustrate examples of hardware configurations of apparatuses according to the present exemplary embodiment.
Figure 2B:
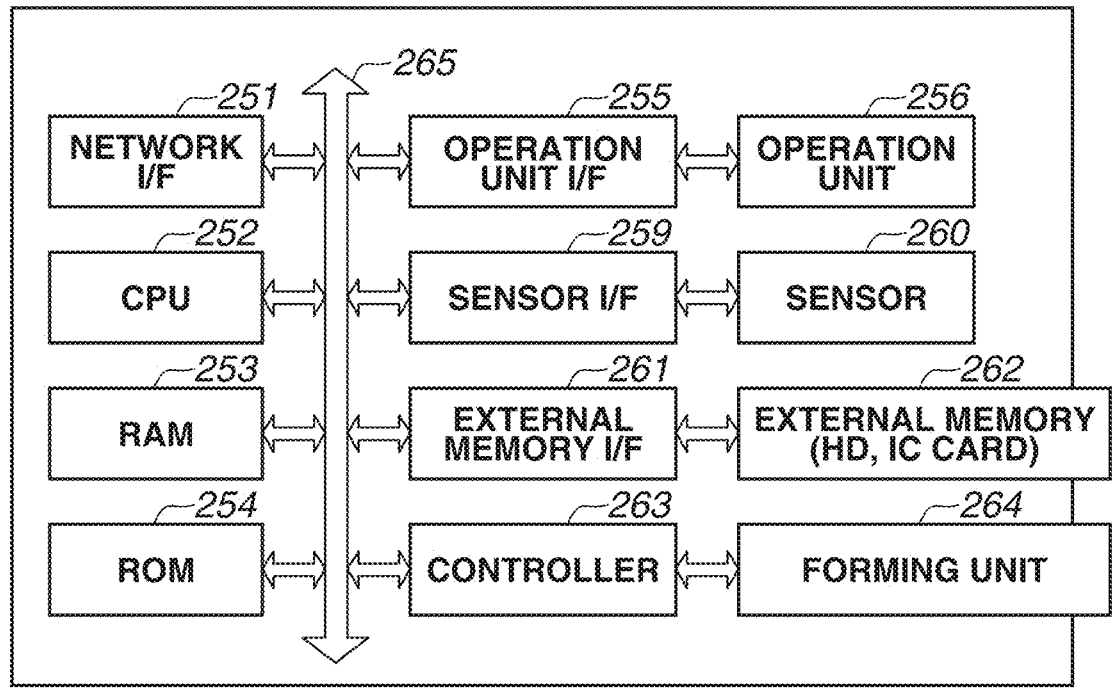

FIGS. 2A and 2B illustrate examples of hardware configurations of the apparatuses according to the present exemplary embodiment. FIG. 2A illustrates a configuration of an information processing apparatus, such as the PC 103. FIG. 2B illustrates a configuration of the forming apparatus 102.

In the information processing apparatus illustrated in FIG. 2A, a central processing unit (CPU) 201 performs a process based on each code of an application program, a program for forming control according to the present exemplary embodiment, or the like stored in a read only memory (ROM) 203 or an external memory 211, and comprehensively controls each of devices connected to a system bus 212. Further, the CPU 201 opens registered various kinds of application windows based on a command issued with, for example, a not-illustrated mouse cursor on a display 209, and performs various kinds of data processing.

A random access memory (RAM) 202 functions as a main memory, a work area, and the like of the CPU 201. The ROM 203 is a read only memory that functions as an area for storing a basic input/output (I/O) program and the like. The ROM 203 or the external memory 211 stores, for example, an operating system (hereinafter referred to as an OS), which is a control program of the CPU 201. Further, the ROM 203 or the external memory 211 stores a file and other various kinds of data to be used in the process based on the above-described application program or the like.

A network interface (I/F) 204 connects to the network 101 and carries out network communication. An input I/F 205 controls inputs from a keyboard 206 and a pointing device 207, such as a mouse. A display I/F 208 controls a display on the display 209. An external memory I/F 210 controls access to the external memory 211, such as a hard disk (HD).

The external memory 211 stores a boot program, various kinds of applications, the program for the forming control according to the present exemplary embodiment, a user file, an editing file, and/or the like. The computer 103 operates with the CPU 201 executing the basic I/O program and the OS written in the ROM 203 or the external memory 211. The basic I/O program is written in the ROM 203, and the OS is written in the ROM 203 or the external memory 211. Then, when the computer 103 is powered on, the OS is written from the ROM 203 or the external memory 211 into the RAM 202 by an initial program load function in the basic I/O program, and then an operation of the OS is started.

In the forming apparatus 102 illustrated in FIG. 2B, a network I/F 251 connects to the network 101 and carries out network communication. Besides that, the forming apparatus 102 may also include a Universal Serial Bus (USB) interface. The forming apparatus 102 will receive a forming instruction and the forming data corresponding to the target object via the network I/F 251 or the not-illustrated USB I/F.

A CPU 252 comprehensively controls each of devices connected to a system bus 265 based on an application program, a program for the forming control according to the present exemplary embodiment, or the like. Especially, the CPU 252 outputs, for example, a control signal for the object formation to a forming unit 264 via a controller 263. A control program is stored in a ROM 254, an external memory 262, or the like. The CPU 252 is configured to be able to perform a communication process with the computer 103 via the network I/F 251, and notify the computer 103 of information in the forming apparatus 102 and the like. Further, the CPU 252 performs a process based on, for example, the application program stored in the ROM 254 or the external memory 262.

A RAM 253 functions as a main memory, a work area, and the like of the CPU 252, and is configured to be able to extent its own memory capacity by an optional RAM connected to a not-illustrated extension port. The RAM 253 is used as an area into which output information is developed, an area in which environmental data is stored, a nonvolatile random access memory (NVRAM), and/or the like. The ROM 254 or the external memory 262 stores the control program of the CPU 252, the application program, font data to be used when the above-described output information is generated, information to be used on the forming apparatus 102, and the like. Further, the ROM 254 or the external memory 262 temporarily stores an application when the application is installed into the forming apparatus 102.

An operation unit I/F 255 is in charge of an interface with an operation unit 256, and outputs image data that should be displayed to the operation unit 256. Further, the operation unit I/F 255 also receives information input by the user via the operation unit 256. The operation unit 256 corresponds to, for example, an operation panel on which a switch for an operation, a light emitting diode (LED) indicator, and the like are provided. A printer I/F 257 outputs an image signal as output information to a printer 258 (a printer engine). A sensor I/F 259 receives a signal as input information from a sensor 260 (a temperature sensor, a vibration sensor, an object identification sensor, or the like). Examples of the sensor 260 further include a sensor that detects a remaining amount of a consumable material to be used in the formation in a material feeding unit set on the forming apparatus 102.

The consumable material such as liquid and powder may be supplied according to a style of supplying it by detachably mounting a cartridge containing the consumable material onto the material feeding unit. Alternatively, the consumable material may be supplied according to a style of manually replenishing the consumable material from a special bottle or the like into the material feeding unit.

An external memory I/F (a memory controller) 261 controls access to the external memory 262, such as an HD and an integrated circuit (IC) card. Further, the forming apparatus 102 may include not only a single memory but also at least one or more memory or memories as the above-described external memory 261, and be configured to allow connections of a plurality of external memories storing an optional font card usable in addition to a built-in font or a program that interprets a printer control language belonging to a different language series. Further, the forming apparatus 102 may include a not-illustrated NVRAM, and be configured to store information about a printer mode setting set from the operation unit 256.

The controller 263 causes the forming unit 264 to perform the forming process based on the received signal for the three-dimensional object formation. The forming unit 264 includes equipment for layering the material, a stage where the object is formed, a device functioning as an energy source for curing the material, and the like, although the included components vary depending on a forming method. The forming unit 264 is configured in a different manner according to the forming method, and specific examples thereof will be described below with reference to FIGS. 3A-1, 3A-2, and 3B.

Although not being illustrated, examples of an optional device addable to the forming apparatus 102 include supplementary equipment that may be required according to the forming method, and a peripheral device that extends the functionality and mechanism of the three-dimensional (3D) printer, such as a camera and an IC card reader. Examples of the supplementary equipment include a device required as a measure against powder in a case of the inkjet method, and a cleaning device required in a case of stereolithography (SLA).

FIGS. 3A-1, 3A-2, and 3B illustrate examples of forming methods for carrying out "additive manufacturing" to which the present exemplary embodiment is applicable.

Figures 1, 3A:
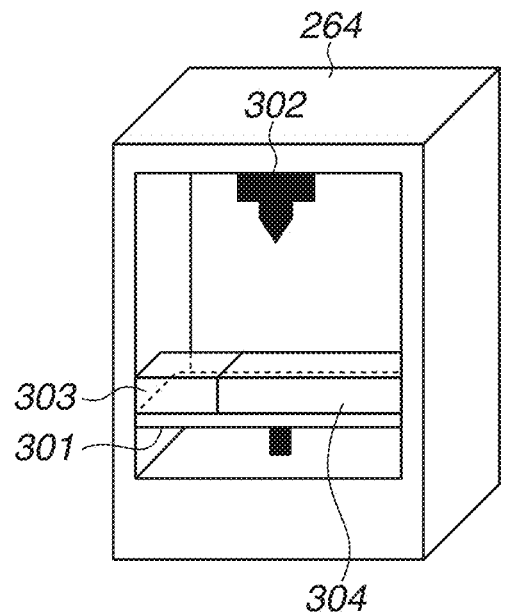

FIG. 3A-1 illustrates a method for forming the three-dimensional object based on the material sheet lamination method.

Figures 2, 3A:
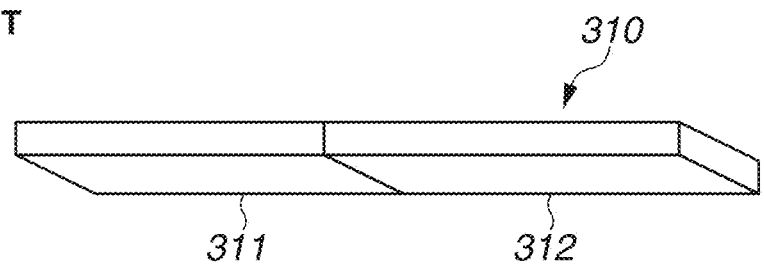

In this method, the forming unit 264 gradually forms an object 304 by additive manufacturing, by repeatedly layering a material sheet 310 on a stage 301 and radiating energy (light, heat, or the like) from an energy source 302. FIG. 3A-2 illustrates one material sheet 310. The material sheet 310 includes a structural material 312 containing the material and a support material 311. The structural material 312 is welded to structural material portions of the material sheets 310 stacked under and on itself by receiving the energy from the energy source 302. This leads to gradual completion of the additive manufacturing object 304. The support material 311 is not welded to the additive manufacturing object 304, and is being layered on the stage 301 as a support 303 of the additive manufacturing object 304. For example, the support 303 is water-soluble, and can be removed by watering the support 303 portion when extracting the additive manufacturing object 304.

In the material sheet lamination method, the delayed join process proposed by the exemplary embodiments of the present invention can be realized by forming the structural material 312 corresponding to the object to be additionally formed at the support material 311 portion of the material sheet 310 corresponding to the object being formed.

Figure 3B:
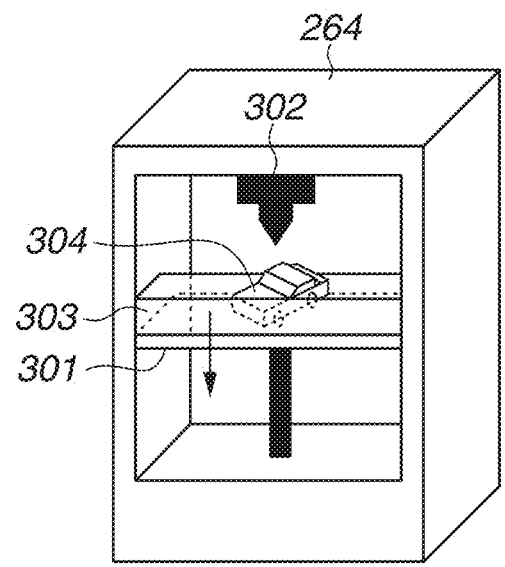

FIG. 3B illustrates a method for additive manufacturing of the three-dimensional object based on the stereolithography method.

In this method, the forming unit 264 gradually forms the object 304 by additive manufacturing, by repeatedly layering a material (ultraviolet-curable resin or the like) on the stage 301 and radiating energy (ultraviolet from a laser, or the like) from the energy source 302. In this case, a portion unexposed to the ultraviolet ends up remaining on the stage 301 without being cured. Accordingly, the uncured material serves as the support for the additive manufacturing object 304 as remaining there. When the forming process is completed, the object 304 can be extracted alone by removing the uncured portion.

In the formation method illustrated in FIG. 3B, the delayed join process proposed by the exemplary embodiments of the present invention can be realized by being adding coordinate information corresponding to the object to be additionally formed to coordinate information corresponding to the object being formed as a position to be irradiated with the energy.

Figure 4:
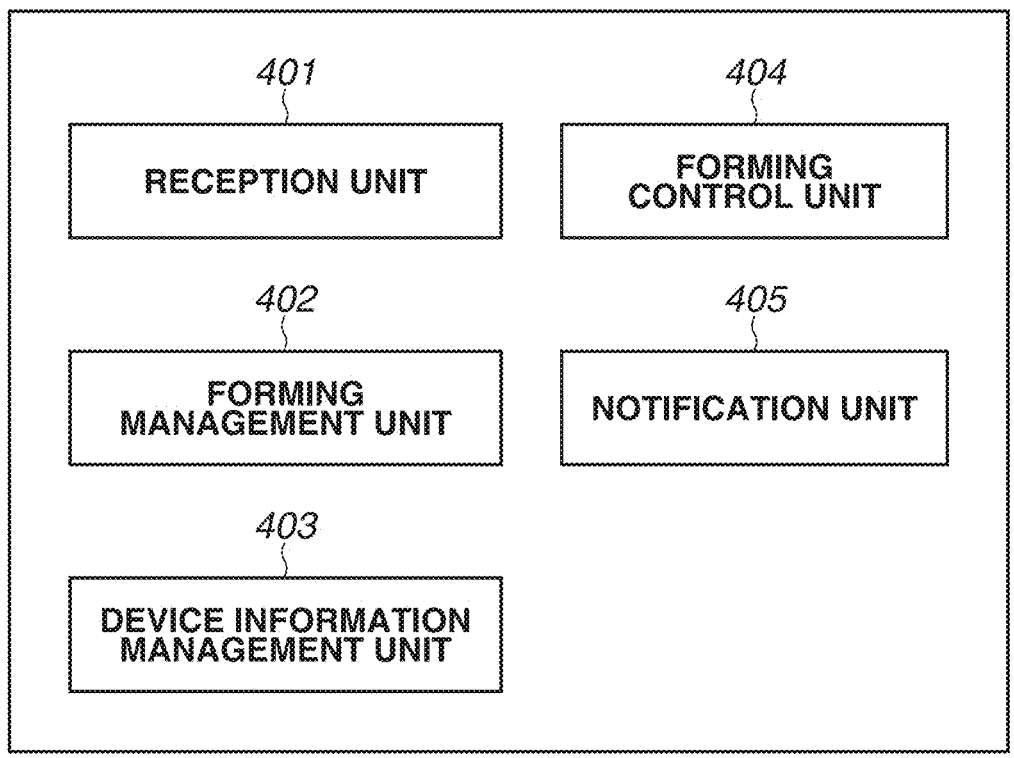
FIG. 4 illustrates an example of a module configuration of software of the apparatuses according to the present exemplary embodiment.

FIG. 4 illustrates an example of a module configuration of software of the apparatuses according to the present exemplary embodiment.

The present drawing is a conceptual drawing for illustrating the present exemplary embodiment, and each module is a module exemplarily depicted so as to serve as a performer of the process realized by the CPU 201 or the CPU 252 executing codes of the above-described program for the forming control.

A reception unit 401 receives the instruction for the delayed join process and the forming data targeted for the delayed join process. The forming data includes, for example, a data file in the Standard Triangulated Language (STL) format that corresponds to three-dimensional model data. The present exemplary embodiment is applicable even when the forming data is data in another format ((the Wavefront Object (OBJ) format or the like) supportable by the PC 103 or the forming apparatus 102, which controls the three-dimensional object formation. Besides that, the present exemplary embodiment is also applicable even when the forming data is data in Additive Manufacturing File Format (AMF). Further, forming commands generated from the model data (data specifying a coordinate position targeted for the forming on each layer surface of the additive manufacturing object) may be used as the forming data.

A forming management unit 402 determines, for example, information about the object being currently formed by the forming apparatus 102, and whether the delayed join process can be performed.

A device information management unit 403 manages performance information of the forming apparatus 102, especially, information including, for example, a size of an entire space where the formation can be carried out on the stage.

A forming control unit 404 controls the forming instruction according to the forming method based on the forming data. More specifically, the forming control unit 404 instructs the forming unit 264 to form the three-dimensional object via the controller 263.

A notification unit 405 issues notifications that convey messages indicating a start and completion of the formation, a failure, a cancellation of the delayed join process, and the like with use of the display 209 or the operation unit 256. The notification unit 405 can also notify an external apparatus of these messages via the network 101.

Figure 5:
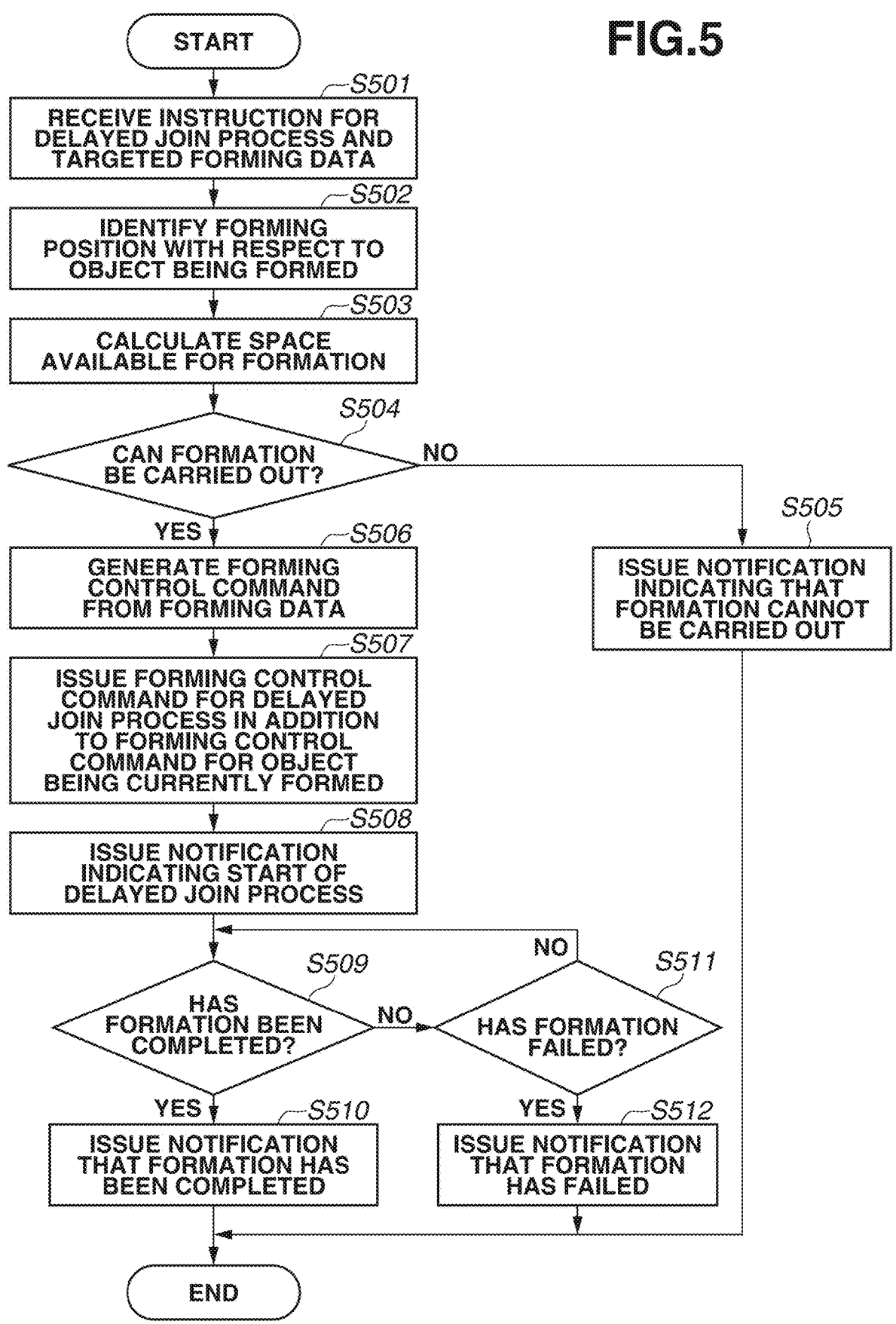
FIG. 5 is a flowchart illustrating a procedure of a delayed join process.

FIG. 5 is a flowchart illustrating a procedure of the delayed join process proposed by the exemplary embodiments of the present invention. The present flowchart illustrates the process realized by the CPU 201 or the CPU 252 executing the above-described program for the forming control. This means that all of the process steps in the present flowchart are performed by the PC 103 or the forming apparatus 102.

For example, it is also possible that the individual steps are performed by being divided between the PC 103 and the forming apparatus 102, like the PC 103 performing only steps involving a notification process, such as steps S505, S508, S510, and S512, which will be described below. In the case where the PC 103 performs the notification process, at least a program for realizing the configuration regarding the notification unit 405 is supposed to be stored and executed therein. The notification by the notification unit 405 is mainly assumed to be achieved by a display on the operation unit 256 of the forming apparatus 102 or the display 209 of the PC 103, but may be issued to the external apparatus in the network 101 with use of an electronic mail or the like.

In step S501, the reception unit 401 receives the instruction for the delayed join process and the forming data targeted for the delayed join process. For example, the user specifies a forming apparatus to be set as a target where the delayed join process is performed from a pull-down menu 702 via a setting screen 701 illustrated in FIG. 7A. The forming apparatus 102 is configured to allow the user to select the forming apparatus currently carrying out the formation among a plurality of pre-registered forming apparatuses capable of performing the delayed join process. The user can further specify various kinds of parameters regarding the forming process as forming settings 703 on the setting screen 701. Further, the user can specify a forming setting specific to the selected forming apparatus on a different screen or the like by pressing an advanced setting button 704. When an ENTER button is pressed on the setting screen 701, the instruction for the delayed join process is issued. The setting screen 701 is displayed on the operation unit 256 of the forming apparatus 102 or the display 209 of the PC 103.

In step S502, the forming management unit 402 identifies a forming position with respect to the object being currently formed. The position can be identified by acquiring the coordinate information on the stage of the forming unit 264 via the forming control unit 404. In step S503, the forming management unit 402 calculates a free space where the formation can be carried out in addition to the object being currently formed on the stage of the forming apparatus 102.

Figure 6A:
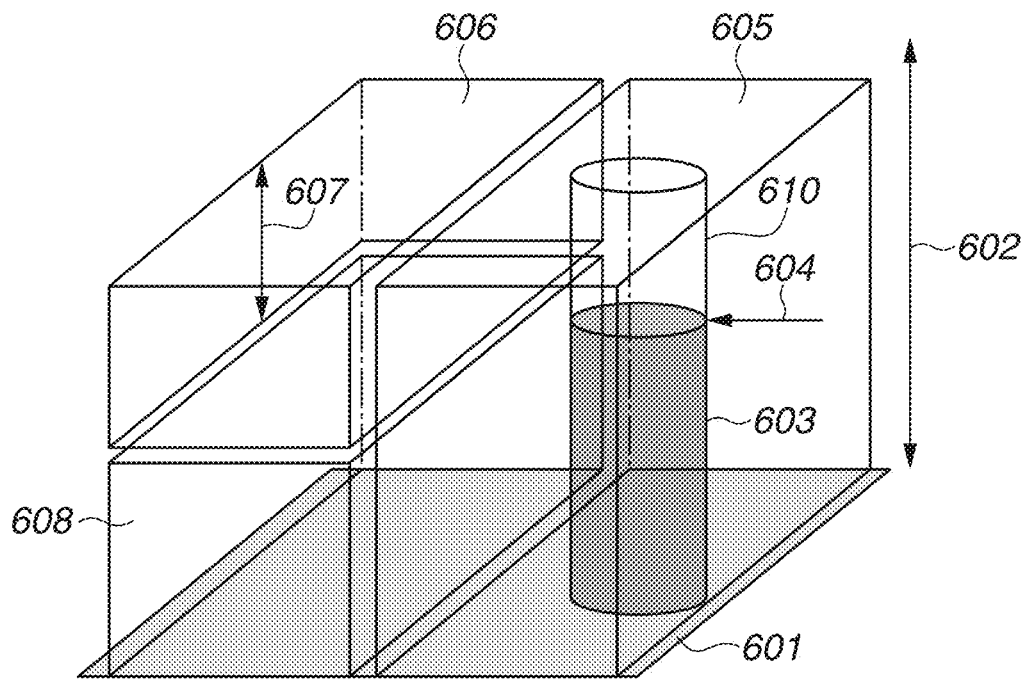
FIGS. 6A and 6B illustrate examples of a forming position in the delayed join process.
Figure 6B:
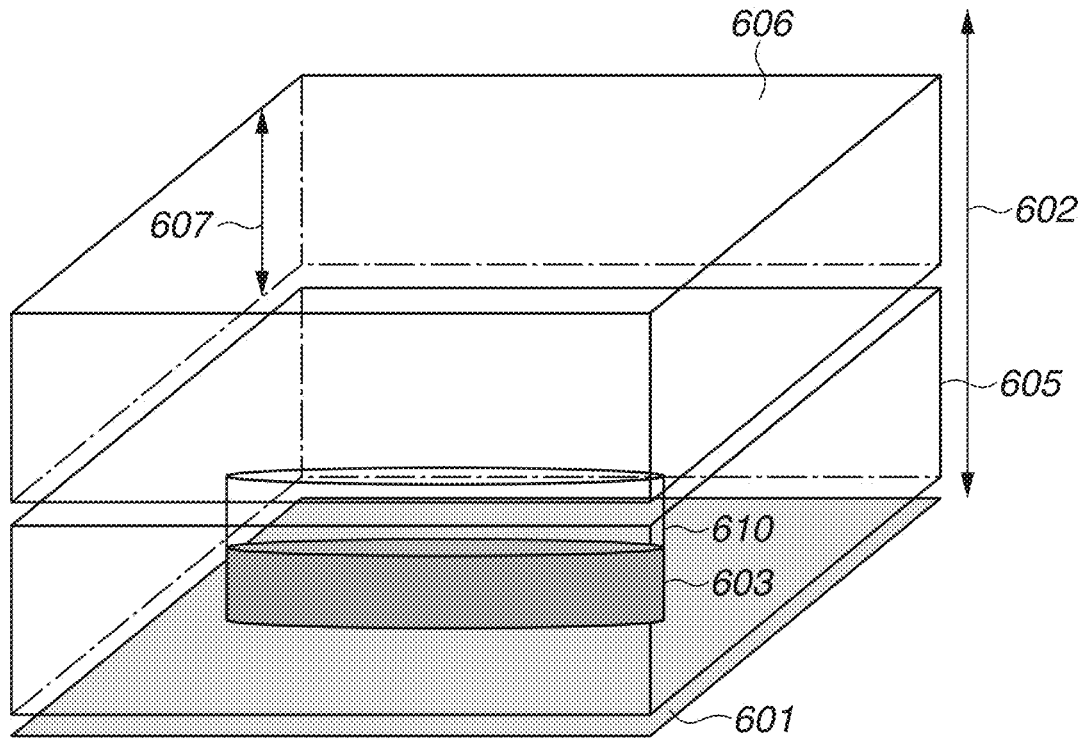

Now, FIGS. 6A and 6B illustrate examples of the forming position in the delayed join process. A method for calculating the free space that is performed by the forming management unit 402 will be described with reference to FIGS. 6A and 6B.

Information indicating the forming position identified in step S502 and information about the entire space where the forming apparatus 102 can carry out the formation on the stage, which is managed by the device information management unit 403, are used for the calculation.

FIG. 6A illustrates a first example of a forming pattern according to which the delayed join process is performed.

In this pattern, a three-dimensional space 605 that would contain the entire additive manufacturing object when the object being formed is completed will be secured in advance on the stage, and the object targeted for the delayed join process will be formed within a space 606 other than the space 605 on the stage.

A stage 601 is positioned inside the forming unit 264, and the above-described material or material sheet is layered thereon. The entire space where the forming apparatus 102 can carry out the formation on the stage 601 is defined by a three-dimensional space formed by the stage 601 and a height 602.

The three-dimensional space 605 is a space that would contain the entire additive manufacturing object when the object being formed is completed. Then, an additive manufacturing object 603 is an already formed object at this point. An object 610 virtually indicates an object before the object is formed. Positional information 604 indicates the forming position of the object being currently formed that is being irradiated with the energy. The positional information 604 should include at least coordinate data indicating a height in a direction perpendicular to a horizontal surface of the stage 601 where the consumable material is layered.

A three-dimensional space 606 is a space prepared above the stage 601 that does not overlap the portion where the three-dimensional space 605 is set up on the stage 601. A coordinate indicating a height of a bottom surface of the three-dimensional space 606 in the direction perpendicular to the horizontal surface of the stage 601 is set to a higher value than the coordinate indicating the height of the positional information 604. The setting of the value is determined according to, for example, a formation speed of the forming apparatus 102. More specifically, the coordinate of the bottom surface of the three-dimensional space 606 in the height direction above the stage 601 is set to a value acquired by adding a predetermined value that allows a command to be additionally issued in time in step S507, which will be described below, to the coordinate of the positional information 604 in the height direction.

The forming management unit 402 manages an area (a width and a depth) of the portion on the stage 601 where the three-dimensional space 605 is set up. Therefore, the forming management unit 402 can acquire a width, a depth, and a height 607 of the three-dimensional space 606 because of the determination of the coordinate indicating the height of the bottom surface of the three-dimensional space 606 in the direction perpendicular to the horizontal surface of the stage 601. In other words, the forming management unit 402 can calculate the free space for the delayed join process in step S503.

A three-dimensional space 608 is a space on the stage 601 that is located below the three-dimensional space 606, and the space 608 is filled with the consumable material, which works as the support when the additive manufacturing object 603 is formed. More specifically, in the case of the material sheet lamination method, the three-dimensional space 608 works as the support 303 formed by the support material 311. Alternatively, in the case of the above-described stereolithography method, the three-dimensional space 608 is filled with the material uncured by the ultraviolet that works as the support. This means that, in the three-dimensional space 606, the object is formed above them working as the support.

The delayed join process according to the forming pattern 1 illustrated in FIG. 6A leads to parallel formation of at least a part of each of the plurality of target objects from halfway through one forming process.

FIG. 6B illustrates a second example of the forming pattern according to which the delayed join process is performed.

In this pattern, the object targeted for the delayed join process will be additionally formed in the space 606 above the three-dimensional space 605 that would contain the entire additive manufacturing object when the object being formed is completed. The additive manufacturing method can shorten a forming time period by adjusting, for example, an orientation of the object so as to reduce the height of the target object on the stage 601. In the case where such control is performed, a space that allows the additional formation remains above the object. The present forming pattern realizes the delayed join process by utilizing the space.

As described above, the stage 601 is positioned inside the forming unit 264, and the above-described material or material sheet is layered thereon. The entire space where the forming apparatus 102 can carry out the formation on the stage 601 is defined by the three-dimensional space designated by the stage 601 and the height 602.

The three-dimensional space 605 is the space that would contain the entire additive manufacturing object when the object being formed is completed. Then, the additive manufacturing object 603 is the already formed object at this point. The object 610 virtually indicates the object before the object is formed.

The coordinate indicating the height of the bottom surface of the three-dimensional space 606 in the direction perpendicular to the horizontal surface of the stage 601 matches a top surface of the three-dimensional space 605, whereby the height 607 of the three-dimensional space 606 can be acquired as a difference from the height 602 of the entire space. The area (the width and the depth) of the three-dimensional space 606 matches the three-dimensional space 605. In other words, the forming management unit 402 can calculate the free space for the delayed join process in step S503.

The delayed join process according to the forming pattern 2 illustrated in FIG. 6B leads to sequential formation of the plurality of target objects during one forming process.

Now, in the present exemplary embodiment, the three-dimensional space 606 is identified by the above-described calculation method, but the free space can also be identified by another method. More specifically, one of other possible methods is to fixedly lay out the forming position of the object being formed and manage this layout, and, further, acquire the coordinate of the height in the direction perpendicular to the horizontal surface of the above-described stage 601 from, for example, an elapsed time period from the start of the formation. The three-dimensional space 606 is identified from these pieces of information. A method other than the examples discussed herein can also be used as the method for identifying the three-dimensional space 606.

In step S504, the forming management unit 402 determines whether the object corresponding to the model data targeted for the delayed join process can be formed in addition to the object being currently formed (whether the delayed join process can be performed). If the forming management unit 402 determines that the delayed join process can be performed (YES in step S504), the processing proceeds to step S506. If the forming management unit 402 determines that the delayed join process cannot be performed (NO in step S504), the processing proceeds to step S505.

As one of determinations in step S504, the forming management unit 402 determines whether the corresponding object can be contained in the free space available for the additional formation that has been calculated in step S503, and will determine that the delayed join process can be performed only if the object can be contained. Further, as another determination, the forming management unit 402 determines whether the delayed join process can be performed by checking whether the forming settings set via the setting screen 701 do not conflict with the forming settings of the object being currently formed. For example, if a type of the material or a thickness of the stacked layer (a layer pitch) is not the same between the respective forming settings, the forming management unit 402 determines that the delayed join process cannot be performed. If there is not such a setting as the one causing a conflict, the forming management unit 402 can determine that the delayed join process can be performed.

In step S505, the notification unit 405 issues a notification indicating that the delayed join process cannot be performed. In the present example, along therewith, the notification unit 405 also issues a notification indicating that the size of the object corresponding to the model data targeted for the delayed join process cannot be formed in the space available for the formation as a reason why the delayed join process cannot be performed.

In step S506, the forming management unit 402 generates the forming control commands based on the forming data targeted for the delayed join process. In step S507, the forming management unit 402 instructs the forming control unit 404 to engage in the formation according to the generated forming control command. For example, the forming control command refers to a command specifying the target position on each layer surface when the object is formed by additive manufacturing at the forming unit 264. As for the delayed join process, the coordinate of the forming position on each layer surface is supposed to be specified in such a manner that the completed object can be contained within the above-described three-dimensional space 606. The forming control unit 404 controls the forming process at the forming unit 264 via the controller 263 in such a manner that the object is formed according to the forming control command issued here in addition to the forming control command for the objet being formed.

In step S508, the notification unit 405 issues a notification indicating the start of the delayed join process.

In step S509, the forming management unit 402 determines whether the delayed join process procedure has been completed. The forming management unit 402 can manage a progress of the delayed join process and an error in the formation by receiving data regarding the progress of the formation via the forming control unit 404. If the forming management unit 402 can determine that the delayed join process procedure has been completed (YES in step S509), the processing proceeds to step S510. If the forming management unit 402 cannot determine that the delayed join process procedure has been completed (NO in step S509), the processing proceeds to step S511. In step S510, the notification unit 405 issues a notification indicating that the delayed join process procedure has been completed.

In step S511, the forming management unit 402 determines whether the delayed join process has failed. If the forming management unit 402 determines that the delayed join process has failed (YES in step S511), the processing proceeds to step S512. If the forming management unit 402 cannot determine that the delayed join process has failed (NO in step S511), the processing returns to step S509. In step S512, the notification unit 405 issues a notification indicating that the delayed join process has failed.

Figure 7A:
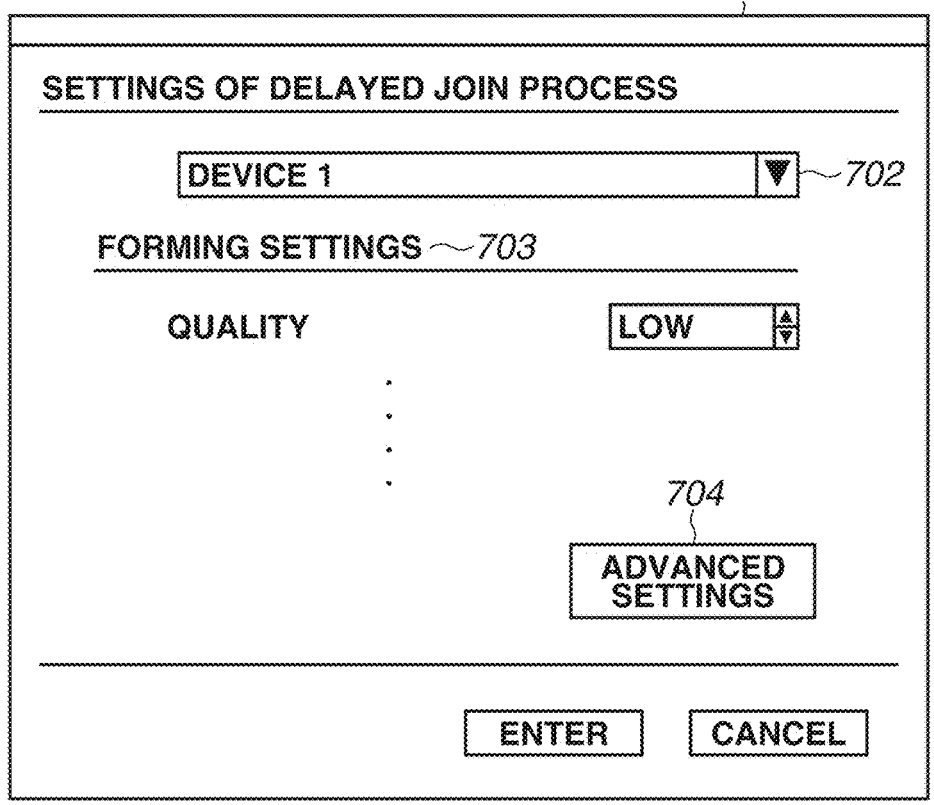
FIGS. 7A, 7B, and 7C illustrate examples of screens displayed in the delayed join process.
Figure 7B:
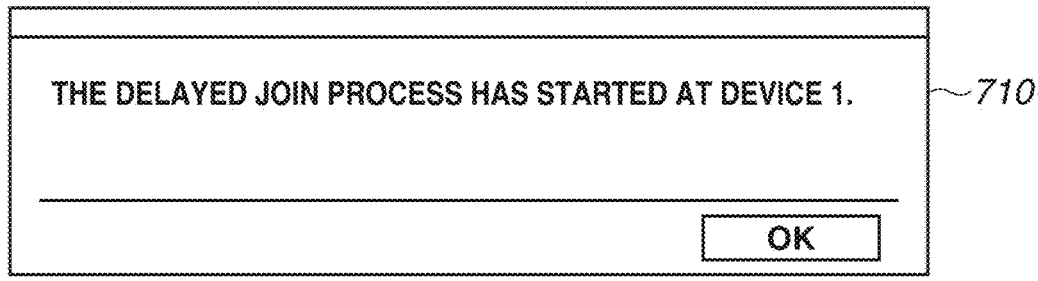
Figure 7C:
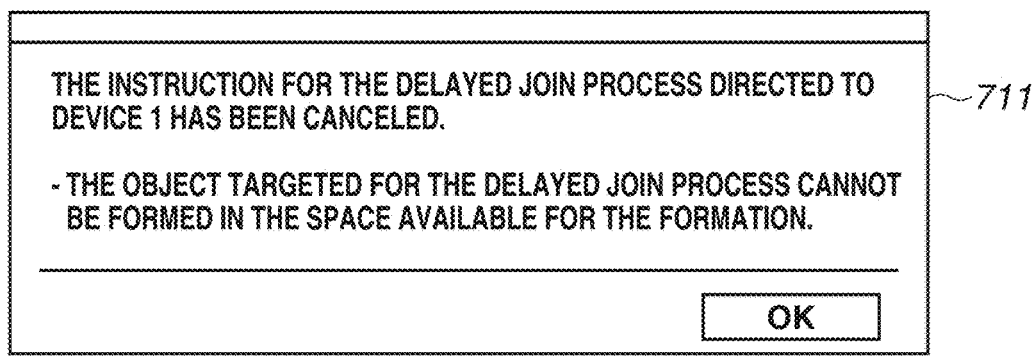

Further, the system can also be configured to allow the instruction for the delayed join process via FIGS. 7A, 7B, and 7C to be issued only toward the forming apparatus performing the forming process.

Figure 9:
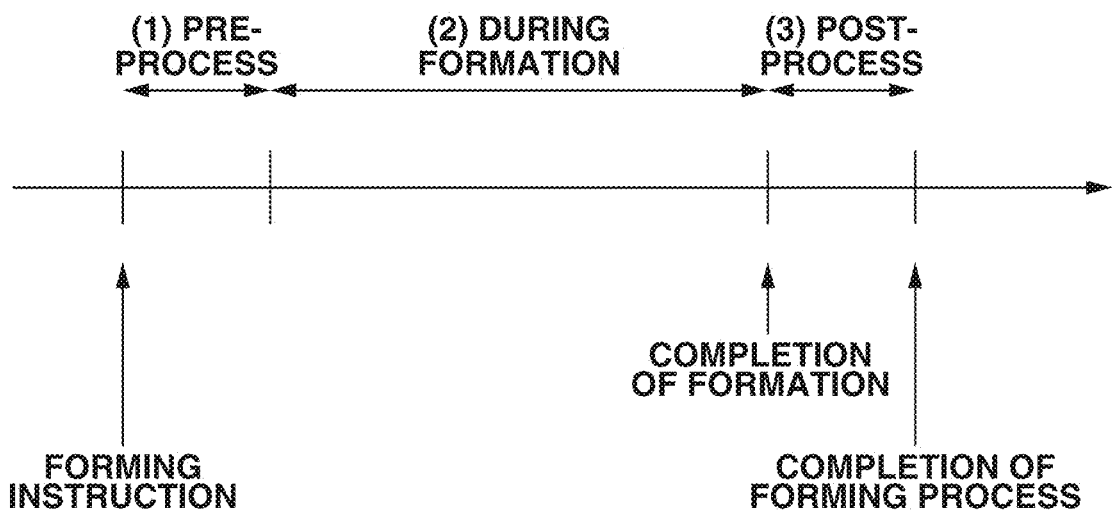
FIG. 9 illustrates a flow of a forming process performed by the forming apparatus and a timing of an instruction for the delayed join process.

Now, a timing at which the instruction for the delayed join process proposed by the exemplary embodiments of the present invention can be issued will be described with reference to FIG. 9.

The forming process at the forming apparatus 102 is started according to the forming instruction from the PC 103 or the forming apparatus 102. In the forming process, first, a pre-process (1) including warming up the forming unit 264 (an adjustment of a position of the stage, an adjustment of a temperature, and the like) is performed. After that, actual additive manufacturing (2) is carried out. Then, after the formation of the object itself is completed, a post-process (3) is performed for the purpose of, for example, safely extracting the additive manufacturing object, and then the forming process is completed. The completion notification in step S510 is issued according to the completion of the entire forming process.

The user is supposed to perform a post-process such as the work of extracting the object and the removal of the support according to the completion notification.

The instruction for the delayed join process proposed by the exemplary embodiments of the present invention is supposed to be received during from the pre-process (1) and the additive manufacturing (2).

Only a type of apparatus capable of carrying out the additional formation during the post-process can receive the instruction for the delayed join process and perform the delayed join process during a time period from the post-process (3) to the completion of the forming process.

According to the first exemplary embodiment, it becomes possible to perform the delayed join process proposed by the exemplary embodiments of the present invention. On the other hand, the execution of the delayed join process results in a delayed completion time of the object already in the middle of being formed. Further, the plurality of formed objects is formed at distant positions, which complicates the post-process such as the extraction of the objects.

Therefore, a second exemplary embodiment further proposes a mechanism for allowing appropriate execution of the delayed join process. The second exemplary embodiment has a system configuration and the like approximately similar to the first exemplary embodiment, and therefore will be described omitting descriptions of such similar features and focusing only on differences from the first exemplary embodiment.

FIG. 8 illustrates a forming setting screen provided by the forming management unit 402 according to the second exemplary embodiment. A setting screen 801 is different from the screen illustrated in FIG. 7A and is a setting screen for issuing the forming instruction to a forming apparatus that is not carrying out the formation. The setting screen 801 is displayed on the operation unit 256 of the forming apparatus 102 or the display 209 of the PC 103.

The user can select the forming apparatus with which the user wants to carry out the formation with use of a pull-down menu 802. Further, the user can configure the various kinds of forming settings on the setting screen 801, similarly to FIGS. 7A, 7B, and 7C.

In a delayed join process setting field 803, the user can set, for example, whether to permit the delayed join process.

In a pull-down menu 804, the user can set in advance whether to accept (permit) the delayed join process for another object in the middle of the forming process for the object set as the target on the present setting screen 801. Specifying "OK" in the menu 804 permits the delayed join process to be performed. Specifying "NG" in the menu 804 prohibits the delayed join process from being performed.

A check box 805 is used to determine whether to set a completion time period of the forming process for the object set as the target on the present setting screen 801. If the check box 805 is checked, the user can set a time period to be taken until the formation is completed.

In a pull-down menu 806, the user sets a desired time period to be taken until the formation is completed. At this time, at least how long it will take for the forming process as the forming time period is predicted from the shape of the object set as the target, the parameters of the forming settings, and the like. Then, the predicted forming time period is set in the menu 806 as default. The user intending to accept the delayed join process in advance is supposed to set a relatively long forming time period by operating the menu 806. The forming time period set here does not include a time period for the post-process regarding the extraction of the object.

In the present exemplary embodiment, a determination process based on the setting specified in the menu 806 is added in step S504 illustrated in FIG. 5 in addition to the first exemplary embodiment.

More specifically, the forming management unit 402 recalculates and predicts the forming time period to be taken when, together with the object being formed, the object targeted for the delayed join process is started to be formed at the same time from halfway, from the shape of the target object for the delayed join process, the parameters of the forming settings, and/or the like. Then, the forming management unit 402 determines whether the procedure of the delayed join process can be completed within the forming time period specified in the menu 806 from the start of the formation of the object being currently formed based on the recalculated time period. If the forming management unit 402 determines that the delayed join process cannot be completed, the processing will proceed from step S504 to step S505.

If the delayed join process is specified to be permitted on the setting screen 801, the forming position of the targeted object is controlled to be displaced closer to a corner on the stage. This control increases a possibility that the delayed join process according to the forming pattern described with reference to FIG. 6A is determined to be able to be performed. Further, similarly, the second exemplary embodiment can also include control of adjusting, for example, the orientation of the object so as to minimize the height of the targeted object in consideration of the forming pattern described with reference to FIG. 6B.

First Exemplary Application

The examples of the forming method to which the delayed join process proposed by the exemplary embodiments of the present invention is applicable also include the subtractive manufacturing method, and stereolithography, powder sintering, and powder binding, which belong to the above-described additive manufacturing method, besides the examples illustrated in FIGS. 3A-1, 3A-2, and 3B. As stereolithography, there are a method using powered resin and a method using liquid as the material. For powder sintering, metallic powder, resin, and the like can be used as the material. For powder binding, for example, a plaster material can be cured and layered with use of a binder.

On the other hand, it is difficult to apply the delayed join process proposed by the exemplary embodiments of the present invention with respect to a forming method that does not move the stage where the object is set up but moves a head or the like for layering the material in the direction perpendicular to the horizontal surface of the stage. However, even for such a forming method, configuring the apparatus to also move the stage divided in advance in the perpendicular direction at the time of the delayed join process allows an additional object to be formed by the delayed join process on the stage. Further, control such as also forming the support material in advance on the stage where no object is formed in preparation for the delayed join process allows an additional object to be formed by the delayed join process on the support material.

Second Exemplary Application

In FIGS. 6A and 6B, the three-dimensional space 605 that would contain the entire additive manufacturing object when the object being formed is completed is secured as a cuboid. However, the three-dimensional space 605 that would contain the entire additive manufacturing object when the object being formed is completed can also be secured in a shape such as a cylindrical shape, a triangular prism shape, a conical shape, a triangular pyramid shape according to the shape of the additive manufacturing object. In such a case, a larger space can be secured as the three-dimensional space 606 for the delayed join process, which further facilitates the application of the delayed join process.

Other Embodiments

Embodiment(s) of the present invention can also be realized by a computer of a system or apparatus that reads out and executes computer executable instructions (e.g., one or more programming codes) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-069176, filed Mar. 30, 2016, which is hereby incorporated by reference herein in its entirety.

What is claimed is:

1. A forming control apparatus for controlling a forming process performed by a forming unit configured to form a three-dimensional object, the forming control apparatus comprising,
a memory storing codes; and
a processor which is capable of executing the codes causing the forming control apparatus to:
calculate a time period to be taken until a forming process performed by the forming unit is completed concerning a first object;
receive, during the forming process for the first object performed by the forming unit, an instruction to form a second object, which is different from the first object, and forming data corresponding to the second object;
specify a third three-dimensional space where, within the forming unit, an object can be additionally formed by the forming unit, based on a first three-dimensional space of the forming unit where an object can be formed and a second three-dimensional space required to form the first object in the first three-dimensional space;
determine whether the second object can be formed in the third three-dimensional space;
recalculate the time period concerning the first object and the second object, as a total time period of the forming process for the first object being formed and the second object determined to be formable; and
issue, to the forming unit, a forming control command based on the forming data for forming the second object in the third three-dimensional space, in addition to a forming control command for forming the first object, in a case where it is determined that the second object can be formed in the third three-dimensional space.

2. The forming control apparatus according to claim 1, wherein, in a case where it is determined that the second object cannot be formed in the third three-dimensional space, the forming control command based on the forming data is not issued and a notification indicating that the second object cannot be formed is issued.

3. The forming control apparatus according to claim 1, wherein the codes further cause the forming control apparatus to determine whether the second object can be additionally formed according to respective forming settings of the first object and the second object,
wherein, in a case where it is determined that the second object cannot be additionally formed, the forming control command based on the forming data is not issued and a notification indicating that the second object cannot be formed is issued, and
wherein, in a case where a forming pitch included in the forming setting of the first object is not the same as a forming pitch included in the forming setting of the second object or in a case where a type of a material included in the forming setting of the first object is not the same as a type of a material included in the forming setting of the second object, it is determined that the second object cannot be additionally formed.

4. The forming control apparatus according to claim 1, wherein the codes further cause the forming control apparatus to set whether to permit another object to be additionally formed while the first object is being formed, when an instruction to form the first object is issued.

5. The forming control apparatus according to claim 1, wherein the forming unit has a configuration in which, in a direction perpendicular to a horizontal surface of a stage where a consumable material including a material for forming the object is layered, the stage moves during the forming process.

6. The forming control apparatus according to claim 1, wherein the forming unit performs the forming process by repeatedly layering a material sheet, the material sheet including a structural material, which is formed into an additive manufacturing object by being welded, and a support material.

7. The forming control apparatus according to claim 1, wherein the codes further cause the forming control apparatus to issue a completion notification in a case where the forming process for the first object and the second object by the forming unit is finished.

8. The forming control apparatus according to claim 1, wherein there is a space where no object is formed between the second three-dimensional space and the third three-dimensional space.

9. A control method comprising:
calculating a time period to be taken until a forming process performed by a forming unit is completed concerning a first object;
receiving, during a forming process for the first object performed by a forming unit configured to form a three-dimensional object, an instruction to form a second object, which is different from the first object, and forming data corresponding to the second object;
specifying a third three-dimensional space where, within the forming unit an object can be additionally formed by the forming unit, based on a first three-dimensional space of the forming unit where an object can be formed and a second three-dimensional space required to form the first object in the first three-dimensional space;
determining whether the second object can be formed in the third three-dimensional space;
recalculating the time period concerning the first object and the second object, as a total time period of the forming process for the first object being formed and the second object determined to be formable; and
issuing, to the forming unit, a forming control command based on the forming data for forming the second object in the third three-dimensional space, in addition to a forming control command for forming the first object, in a case where it is determined that the second object can be formed in the third three-dimensional space.

10. The control method according to claim 9, wherein, in a case where it is determined that the second object cannot be formed in the third three-dimensional space, the forming control command based on the forming data is not issued and a notification indicating that the second object cannot be formed is issued.

11. The control method according to claim 9, further comprising:
  determining whether the second object can be additionally formed according to respective forming settings of the first object and the second object,
  wherein, in a case where it is determined that the second object cannot be additionally formed, the forming control command based on the forming data is not issued and a notification indicating that the second object cannot be formed is issued, and
  wherein, in a case where a forming pitch included in the forming setting of the first object is not the same as a forming pitch included in the forming setting of the second object or in a case where a type of a material included in the forming setting of the first object is not the same as a type of a material included in the forming setting of the second object, it is determined that the second object cannot be additionally formed.

12. The control method according to claim 9, further comprising:
  setting whether to permit another object to be additionally formed while the first object is being formed, when an instruction to form the first object is issued.

13. The control method according to claim 9, further comprising:
  performing the forming process by repeatedly layering a material sheet, the material sheet including a structural material, which is formed into an additive manufacturing object by being welded, and a support material.

14. A non-transitory computer readable storage medium on which is stored a computer program for causing a computer to execute a control method, the method comprising:
  calculating a time period to be taken until a forming process performed by a forming unit is completed concerning a first object;
  receiving, during a forming process for the first object performed by a forming unit configured to form a three-dimensional object, an instruction to form a second object, which is different from the first object, and forming data corresponding to the second object;
  specifying a third three-dimensional space where, within the forming unit, an object can be additionally formed by the forming unit, based on a first three-dimensional space of the forming unit where an object can be formed and a second three-dimensional space required to form the first object in the first three-dimensional space;
  determining whether the second object can be formed in the third three-dimensional space;
  recalculating the time period concerning the first object and the second object, as a total time period of the forming process for the first object being formed and the second object determined to be formable; and
  issuing, to the forming unit, a forming control command based on the forming data for forming the second object in the third three-dimensional space, in addition to a forming control command for forming the first object, in a case where it is determined that the second object can be formed in the third three-dimensional space.

15. The non-transitory computer readable storage medium according to claim 14, wherein, in a case where it is determined that the second object cannot be formed in the third three-dimensional space, the forming control command based on the forming data is not issued and a notification indicating that the second object cannot be formed is issued.

16. The non-transitory computer readable storage medium according to claim 14, further comprising:
  determining whether the second object can be additionally formed according to respective forming settings of the first object and the second object,
  wherein, in a case where it is determined that the second object cannot be additionally formed, the forming control command based on the forming data is not issued and a notification indicating that the second object cannot be formed is issued, and
  wherein, in a case where a forming pitch included in the forming setting of the first object is not the same as a forming pitch included in the forming setting of the second object or in a case where a type of a material included in the forming setting of the first object is not the same as a type of a material included in the forming setting of the second object, it is determined that the second object cannot be additionally formed.

17. The non-transitory computer readable storage medium according to claim 14, further comprising:
  setting whether to permit another object to be additionally formed while the first object is being formed, when an instruction to form the first object is issued.

18. The non-transitory computer readable storage medium according to claim 14, further comprising:
  performing the forming process by repeatedly layering a material sheet, the material sheet including a structural material, which is formed into an additive manufacturing object by being welded, and a support material.

* * * * *